(12) United States Patent
Martinez et al.

(10) Patent No.: US 7,564,425 B2
(45) Date of Patent: Jul. 21, 2009

(54) MODULAR DISPLAY DEVICE

(75) Inventors: Anthony Edward Martinez, Spicewood, TX (US); Michael D. Rahn, Rochester, MN (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 1705 days.

(21) Appl. No.: 10/116,566

(22) Filed: Apr. 4, 2002

(65) Prior Publication Data

US 2003/0189529 A1 Oct. 9, 2003

(51) Int. Cl.
G09G 5/00 (2006.01)
(52) U.S. Cl. ...................................................... 345/1.3
(58) Field of Classification Search .................. 345/1.3, 345/3.1, 4, 1.1, 55, 103, 1.2; 715/779; 74/502.4, 74/502.6; 285/239, 267, 316, 328, 333, 921; 403/328; 604/533, 535, 536
See application file for complete search history.

(56) References Cited

U.S. PATENT DOCUMENTS

| | | | |
|---|---|---|---|
| 5,128,662 A | 7/1992 | Failla | 340/752 |
| 5,768,096 A | 6/1998 | Williams et al. | 361/681 |
| 5,790,096 A | 8/1998 | Hill, Jr. | 345/150 |
| 5,867,654 A * | 2/1999 | Ludwig et al. | 709/204 |
| 6,191,758 B1 * | 2/2001 | Lee | 345/2.2 |
| 6,229,697 B1 | 5/2001 | Selker | 361/683 |
| 6,302,612 B1 * | 10/2001 | Fowler et al. | 403/76 |
| 6,314,669 B1 * | 11/2001 | Tucker | 40/448 |
| 6,493,002 B1 * | 12/2002 | Christensen | 715/779 |
| 6,593,902 B1 * | 7/2003 | Ogino et al. | 345/55 |
| 6,664,989 B1 * | 12/2003 | Snyder et al. | 345/856 |
| 6,702,604 B1 * | 3/2004 | Moscovitch | 439/374 |

\* cited by examiner

*Primary Examiner*—Abbas I Abdulselam
(74) *Attorney, Agent, or Firm*—Yee & Associates, P.C.; Carlos Munoz-Bustamante; Rudolf O. Siegesmund

(57) ABSTRACT

An improved computer display device is disclosed. The improved computer display device comprises a display monitor and at least one display module each containing their own desktop real estate and each lined with a series of male and female couplers containing electrical connections is disclosed. When the couplers are connected, they are capable of supporting the weight of the display module when attached to the display monitor. The couplers allow information to be transmitted back and forth between the display module and the display monitor, and allow the modules to be connected in various configurations. The display monitor and display module communication allows the icons, programs, applications and cursor on the desktop to be positioned anywhere on the improved display device.

20 Claims, 12 Drawing Sheets

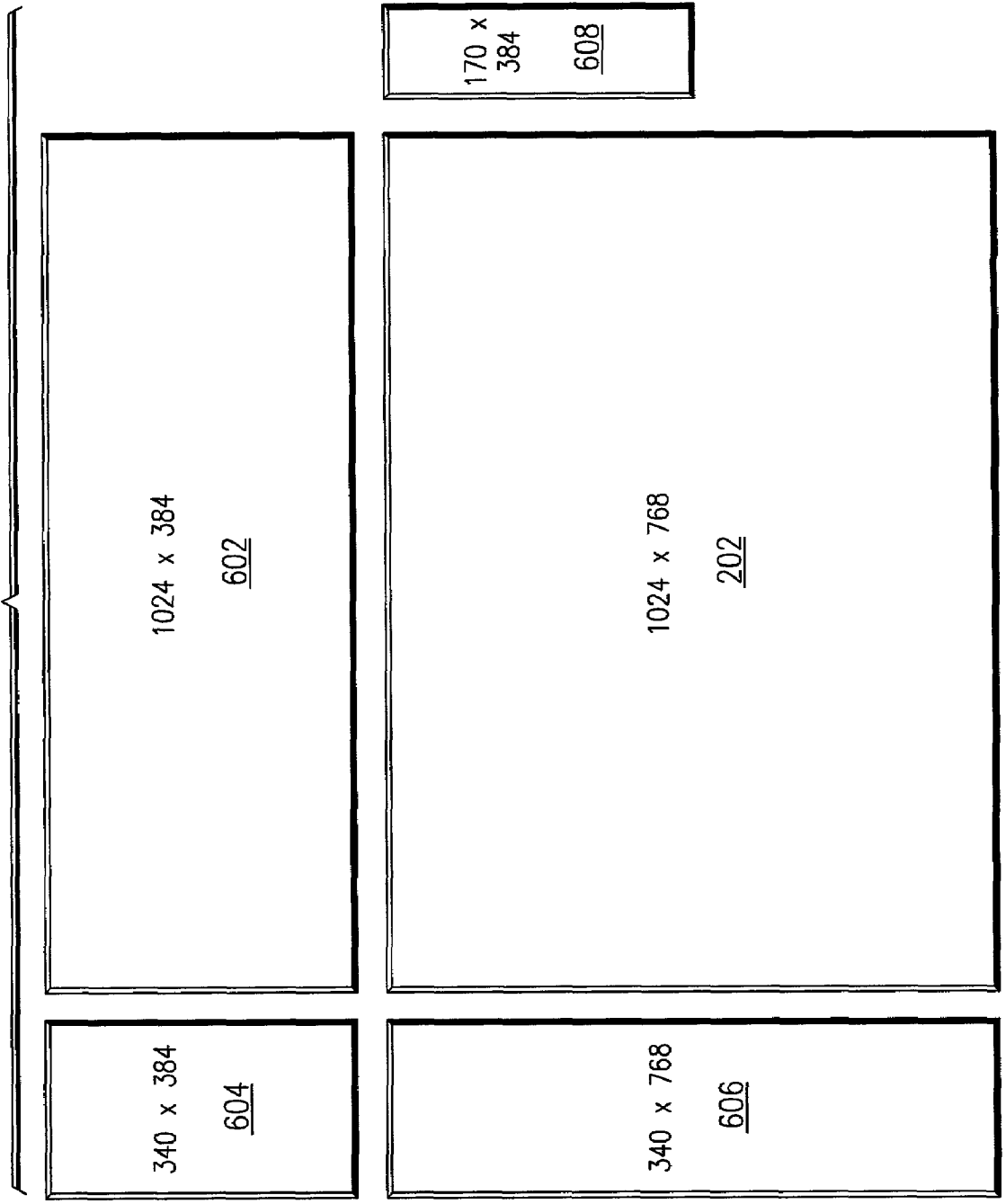

MODULAR DISPLAY DEVICE

FIELD OF THE INVENTION

The present invention relates to modular additions to graphical display devices and improvements thereon.

BACKGROUND OF THE INVENTION

Flat panel LCD computer monitors are well known in the art. Unfortunately, flat panel LCD computer monitors have a fixed amount of real estate for users to work within (i.e. 1024×768 pixels). Although available in different sizes and aspect ratios, these monitors are also restricted to rectangular geometry. The inflexible characteristics of geometry and real estate often limit the ease of use and broad application of display technology. Over the years, computers have become faster and contain more robust operating systems, applications, memory, and hardware. Regrettably, the screen geometry and real estate have not advanced accordingly.

LCD screen technology has advanced to the point where fiber optics can be used to display images up to the edge of the display monitor, such that the protective casing is not visible from the front of the display monitor. Such technology is described in U.S. Pat. No. 5,128,662 issued Jul. 7, 1992 entitled "Collapsibly Segmented Display Screen for Computers or the Like" and U.S. Pat. No. 5,768,096 issued Jun. 16, 1998 entitled "Portable Computer with Movable Display Panels Forming a Concatenated Display Screen in Response to Opening the Computer." While various applications for this technology have been conceived, the previous inventions have not disclosed a method for expanding the display device beyond its initial size, or for any type of display geometries besides a rectangular display.

Traditional computer displays reveal only a fixed, finite portion of the total desktop, both visible and virtual. Current windows-type computer operating systems allow application windows and other objects to be placed on the virtual desktop outside the visible desktop area, where the application and other objects become clipped at the boundaries of the display area. Users have to reposition or resize some or all of the programs if part of one of the applications fall outside of the visible desktop area. For example, in FIG. 1 the user would have to move or resize program 3 so that the entire application window fits within the visible desktop area. This limitation forces the user to adapt to the constraints of the computer. The user will likely have to reorganize, minimize, or hide programs 1 and 2 in order to effectively work with program 3. Managing programs in this manner is very cumbersome. Therefore, a need exists for a display device that enables the user to reveal more of the virtual desktop (i.e. around program 3 at the lower right corner of the display in FIG. 1). Furthermore, a need exists for an apparatus and method that will allow the display device to be adaptable to a variety of different display size and configuration requirements. Finally, a need exists for an apparatus and method to increase the amount of real estate and/or screen configuration of an existing display device.

SUMMARY OF THE INVENTION

The present invention, which meets the needs identified above, is an improved computer display device which is capable of displaying more computer desktop space than traditional display devices. The invention comprises a display monitor and at least one display module. The display monitor and the display module each contain their own desktop real estate. When the display module and the display monitor are connected together, the two desktops merge and create the improved desktop.

The display module and the display monitor are lined with a series of male and female couplers which contain electrical connections. When the couplers are connected, they are capable of supporting the weight of the display module when attached to the display monitor. Additionally, the couplers provide power to the display module and all the transmission of information back and forth between the display module and the display monitor. The transmitted information includes display data, the module size, and the module boundaries. Having couplers along the periphery of the display monitor and the display module allows the modules to be connected in various configurations and also allows the display modules to be indirectly connected to the display monitor through at least one other display module. The display monitor and display module communication allows the icons, programs, applications and cursor on the desktop to be positioned anywhere on the improved desktop.

As the newly created improved desktop may contain areas of concavity which were previously impossible given existing rectangular display devices, a new series of cursor rules has also been invented. As with the traditional desktop, the cursor may not leave the confines of the improved desktop. In other words, the cursor may not "shortcut" across the virtual desktop space which is not visible on either the display module or the display monitor. However, just as applications and programs could be placed on the virtual desktop in the traditional display device, applications and programs can be placed on the virtual desktop in the improved display device.

BRIEF DESCRIPTION OF THE DRAWINGS

FIG. 6 is an illustration of different examples of display modules.

DETAILED DESCRIPTION OF THE PREFERRED EMBODIMENT

Figure 1:
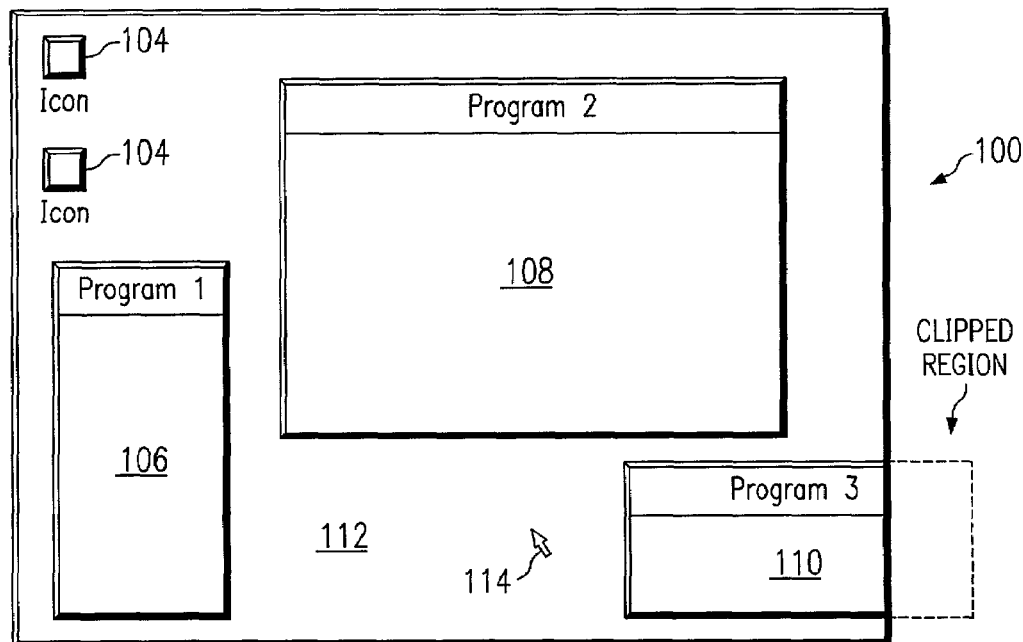
FIG. 1 is an illustration of the traditional display with "Program 3" becoming clipped as it falls partially outside the desktop.

As used herein, the term "desktop" means an on-screen work area that uses icons and menus to simulate the top of a desk. A desktop is characteristic of the APPLE MACINTOSH and of windowing programs such as IBM OS/2 and MICROSOFT WINDOWS. The intent of a desktop is to make a computer easier to use by enabling users to move applications, programs, icons, and pictures of objects, and to start and stop tasks in much the same way as they would if they were working on a physical desktop. The term desktop refers to real desktop space, which is visible on a display device, as opposed to virtual desktop space. As used herein, the term "virtual desktop" means an off-screen work area that uses icons and menus to simulate the top of a desk, but is outside of the display boundaries of a display device. Windows, programs, and applications may be placed on the virtual desktop, but the virtual desktop is not accessible to the cursor. As used herein, the term "real estate" means real desktop space. As used herein, the term "display monitor" means the device on which images generated by the computer's video adapter are displayed. As used herein, the term "display module" means a display device which may be attached to the display monitor and displays additional desktop space. The display module communicates with the display monitor such that the cursor can access both the display monitor desktop and the display module desktop. As used herein, the term "cursor" means the arrow or other on-screen icon that moves with movements of the mouse or similar input device. As used herein, die term "communication" means the process by which one computer component interfaces with another computer component. Communication is usually indicative of transmission of electrical signal, but can also include fiber optic transmissions, microwave signals, infrared signals, and other wireless transmission types. As used herein, the term "direct attachment" means an attachment between the display monitor and the display module via a single set of couplers. As used herein, the term "indirect attachment" means an attachment between the display monitor and the display module via a plurality of sets of couplers. Indirect attachment occurs when a display module is attached to another display module which is attached to the display monitor. The display monitor and the indirectly attached display module do not come into direct contact with each other. As used herein, the term "handshake signal" means an initial communication between a display module and a display monitor that takes place when power is provided to the display module. For a handshake signal to be communicated the display module and the display monitor must be attached to each other by either direct attachment or indirect attachment. The handshake signal is initiated by the display module and provides information necessary for the display monitor to recognize the display module so that the display module and the display monitor may continue to communicate until power is turned off.

FIG. 1 is an illustration of a traditional display device 100. Traditional display device 100 comprises display monitor 102, icons 104, applications 106, 108, 110, desktop 112, and cursor 114. Icons 104 and applications 106, 108, and 110 are placed on desktop 112, but may also be placed on the virtual desktop (not shown). In FIG. 1, the right half of application 110 is placed on the virtual desktop. Cursor 114 is used to manipulate program icons 104 and program applications 106, 108, 110. However, cursor 114 cannot extend beyond desktop 112 onto the virtual desktop.

Figure 2A:
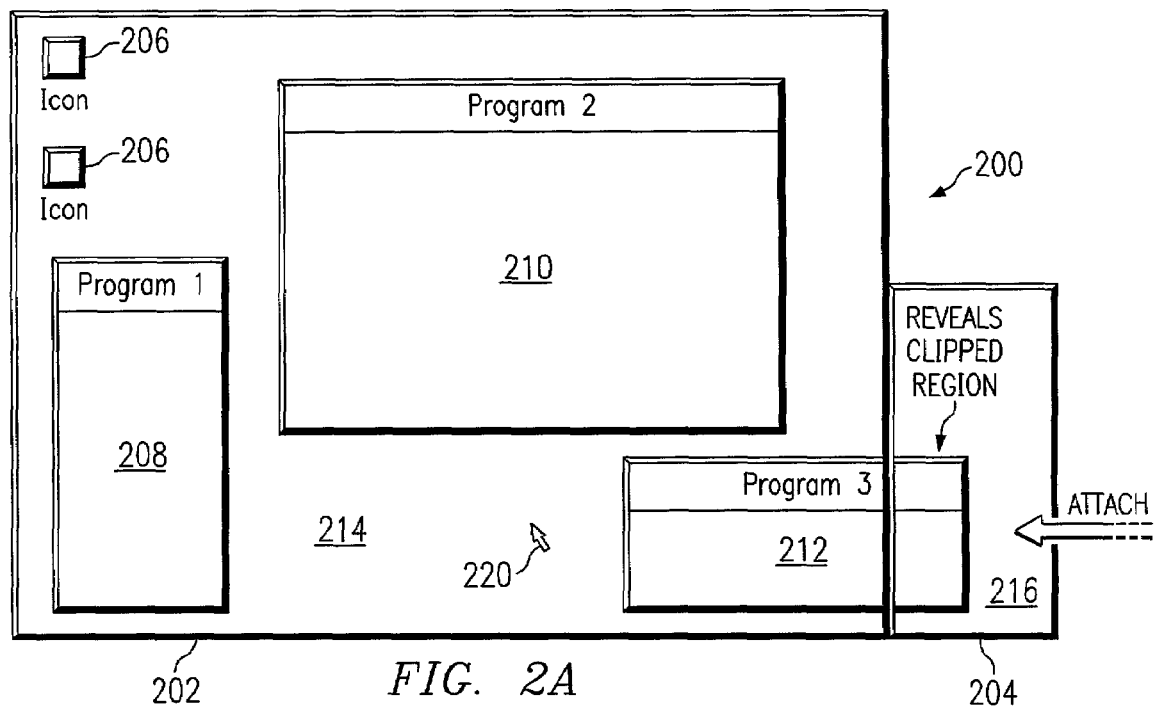
FIG. 2A is an illustration of the process of attaching a display module onto the display monitor.
Figure 2B:
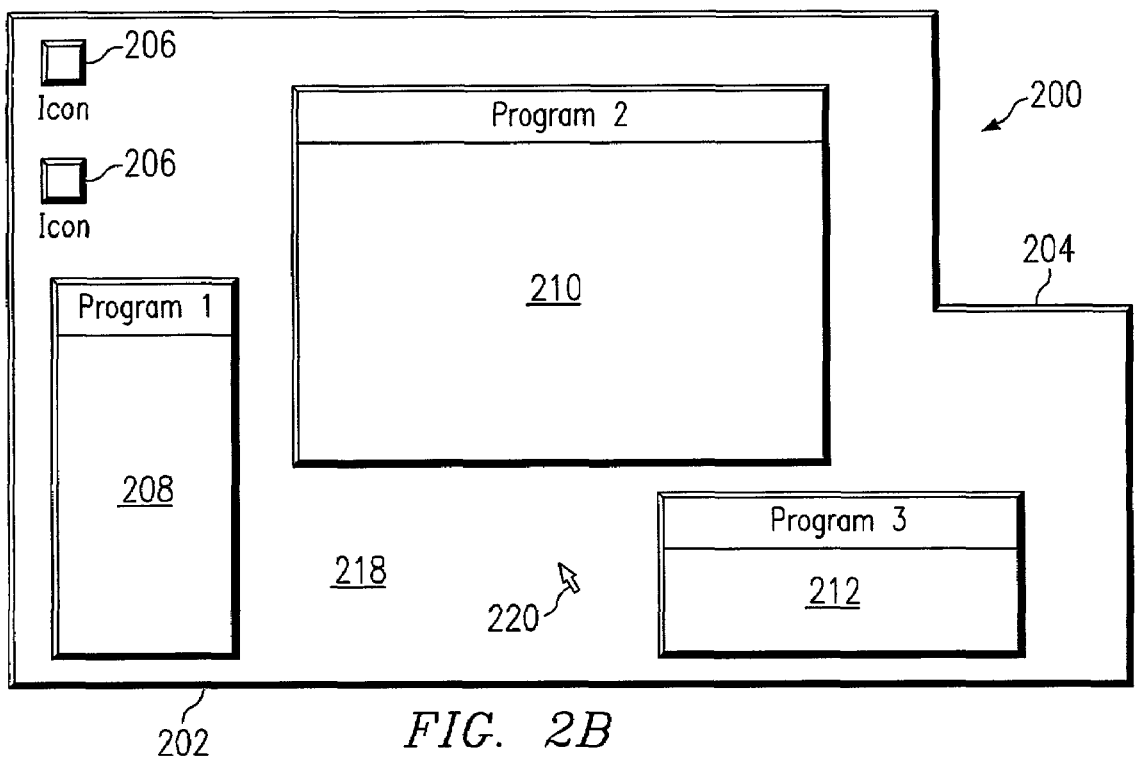
FIG. 2B is an illustration of the improved desktop.

The present invention is an improved display device incorporating a display module which attaches to the display monitor. FIG. 2A is an illustration of improved display device 200 showing the process of attaching display module 204 to display monitor 202. Display module 204 allows virtual desktop space to be converted into real desktop space. The addition of more real estate to the desktop gives the user additional flexibility in running multiple applications simultaneously. Similar to traditional display device 100, improved display device 200 comprises display monitor 202, display module 204, icons 206, applications 208, 210, 212, display monitor desktop 214, display module desktop 216, and cursor 220. As seen in FIG. 2B, the addition of display module 204 to display-monitor 202 creates improved desktop 218, which has more real estate than traditional desktop 100. As the LCD screens in both the display monitor and the display module can be capable, through the use of fiber optics or of other technologies known to persons skilled in the art, of displaying an image up to the edge of the device, the illustration in FIG. 2B is an accurate representation of improved desktop 218. Cursor 220 flows freely across improved desktop 218, which in FIG. 2B is comprised of display monitor desktop 214 and display module desktop 216. The increased real estate of improved desktop 218 allows the user to place application 212 in a position on improved desktop 218 where the entire application can be viewed, alleviating the need to have application 212 clipped by the previous boundary of display monitor 202. With the addition of display module 204 to display monitor 202, users can work with the additional real estate just as they did with the original desktop.

Although display modules can come in assorted sizes and aspect ratios, the one selected for FIGS. 2A and 2B resulted in a non-rectangular display surface. This was done deliberately as non-rectangular display geometries can open up a world of possibilities and uses where the environment imposes real estate constraints. Examples of applications which frequently desire non-rectangular display geometries include industrial control panels, automotive dashboards, and aircraft cockpits, where irregular and non-flat, curving surfaces are typical.

Figure 3:
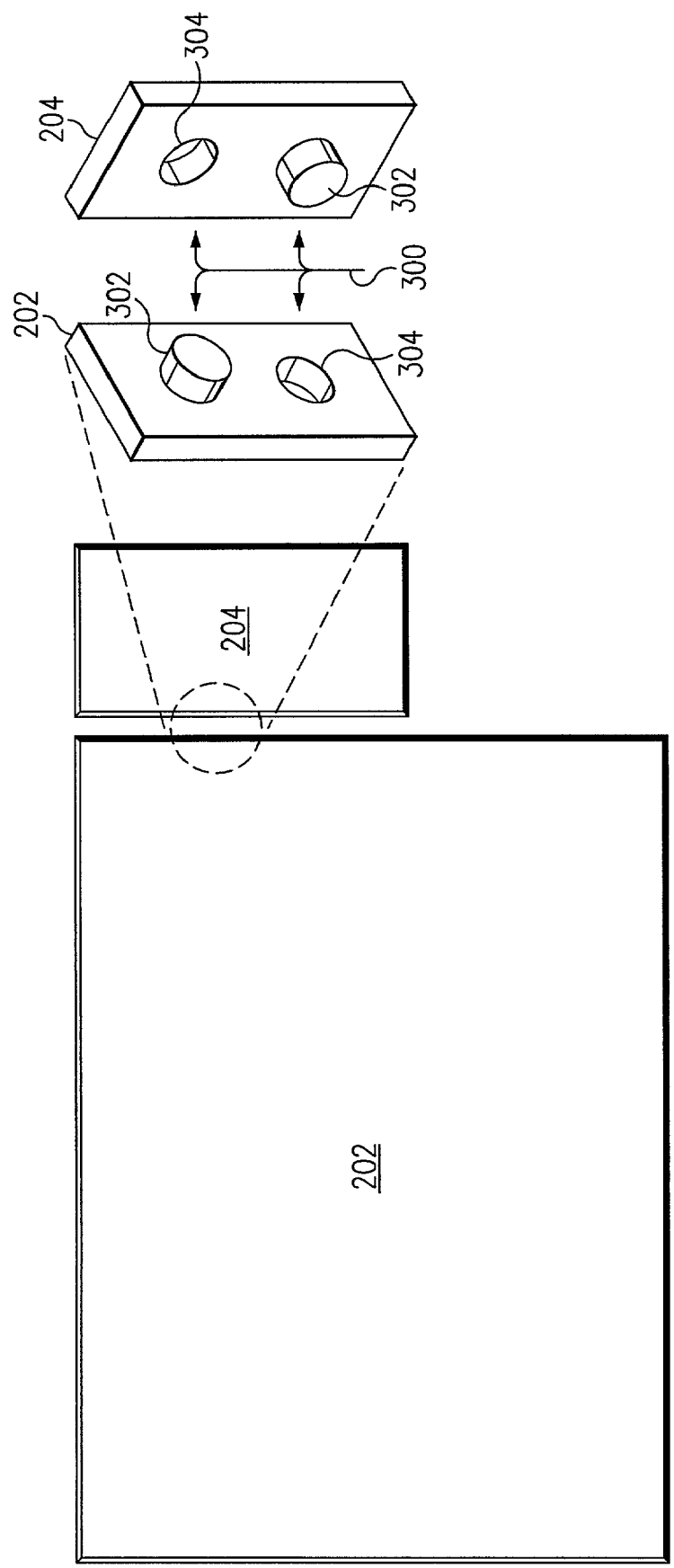
FIG. 3 is an illustration of the details of the couplers between the display monitor and the display module.

FIG. 3 is an illustration of the connections between display monitor 202 and display module 204. Male couplers 302 and female couplers 304 (couplers 300) surround the perimeter of both display monitor 202 on the left and display module 204 on the right. Couplers 300 serve three primary functions. First, they mesh together, providing a secure physical connection between the main display and each display module. If desired, additional clasps, clips, or support structures could be added to reinforce the physical connection. Second, they provide an electrical connection to power the display modules. Third, they provide a conduit for the main display to communicate row and column data to the modules. Couplers 300 resemble those made on children's blocks, such as LEGO® brand children's blocks. Couplers 300 alternate between male coupler 302 and female coupler 304 as illustrated in FIG. 3, allowing display module 204 to connect to display monitor 202 at any orientation. The alternating coupler design also allows display modules to be "daisy chained" together so that the display modules may be indirectly attached to display monitor 202 through another display monitor.

As seen in FIG. 3, the periphery of both display monitor 202 and display housing 204 are lined with the series of alternating male 302 and female 304 couplers. Couplers 300 are evenly spaced and connected together with sufficient rigidity to support the weight of display module 204 when attached to display monitor 202. Additionally, couplers 300 contain a series of electrical connections that allow communication between display monitor 202 and display module 204. The electrical connections on couplers 300 also supply power to display module 204.

Figure 4:
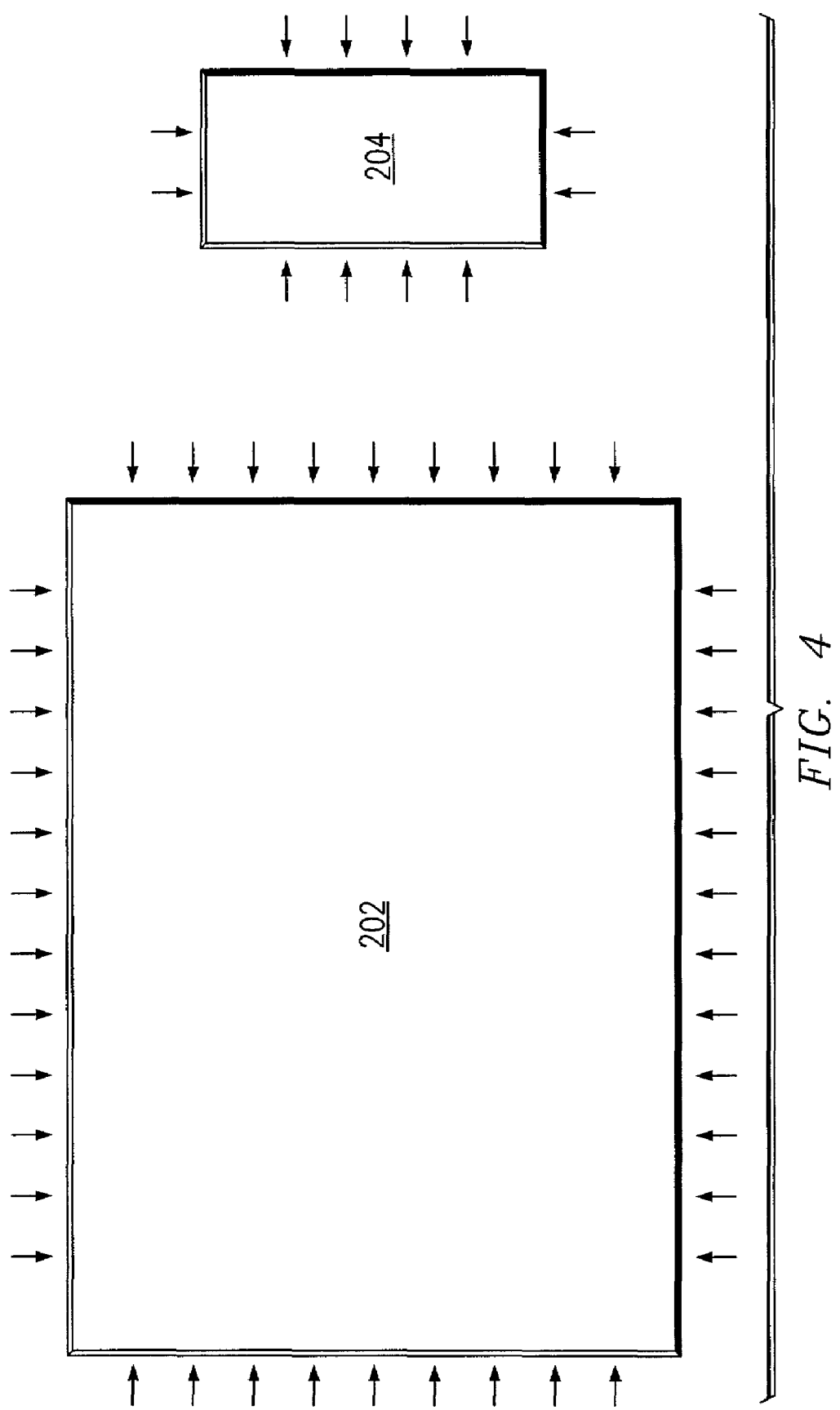
FIG. 4 is an illustration detailing the location of the couplers on the display monitor and the display module.

FIG. 4 is an illustration of the location of couplers 300 on display monitor 202 and display module 204. Couplers 300 can be located on any number of sides of display monitor 202 and display module 204, however in the preferred embodiment couplers 300 are located along the entire periphery of display monitor 202 and display module 204. Those skilled in the art are aware of couplers which provide structural support and electrical connections and will know how to best configure couplers 300.

Figure 5:
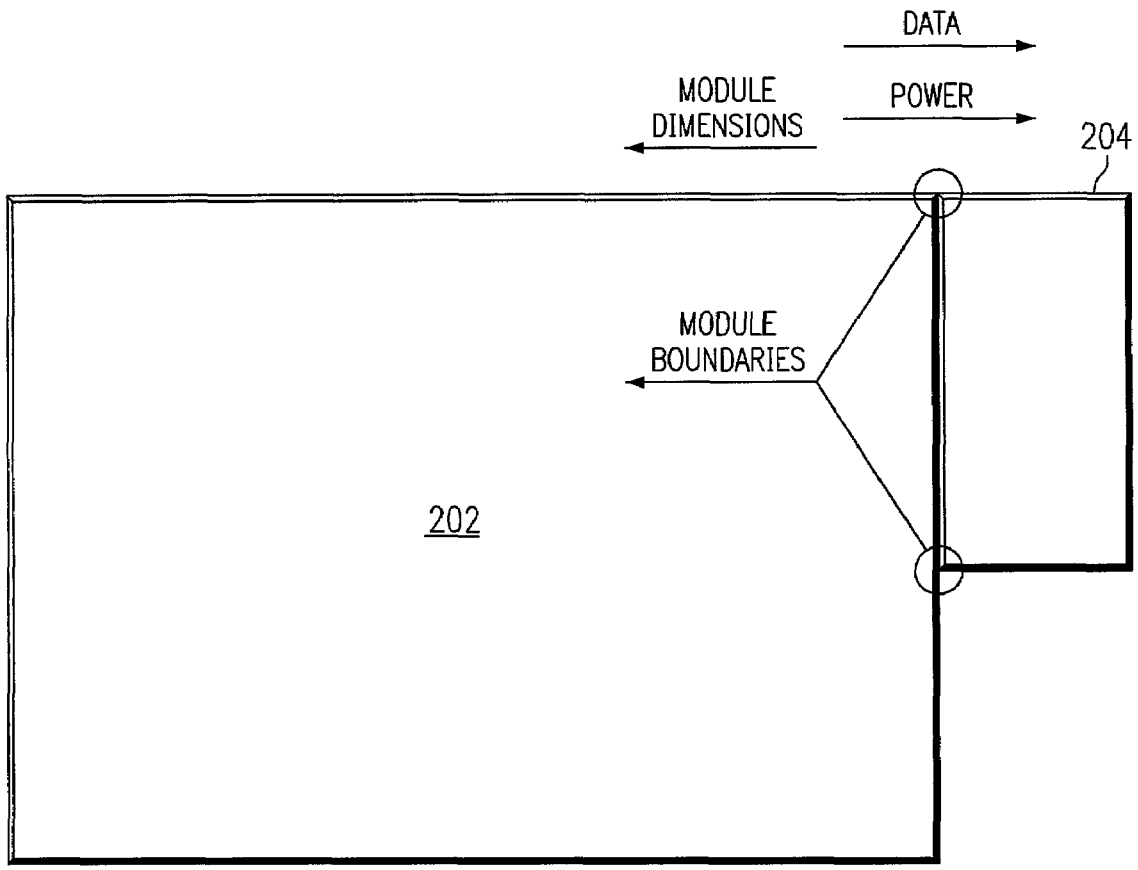
FIG. 5 is an illustration detailing the communication of information between the display monitor and the display module.

FIG. 5 is an illustration of the exchange of information between display monitor 202 and display module 204. Couplers 300 create an electrical connection between display monitor 202 and display module 204 and make the exchange of information between display monitor 202 and display module 204 possible. When display module 204 is connected to display monitor 202, display monitor 202 supplies power and display data to display module 204. Internal circuitry 700 of display module 204 requires power to display the display module desktop 216 and to send display data back to display monitor 202. Display data comprises the orientation and dimensions of the additional real estate (display module desktop 216) created by the addition of display module 204 to display monitor 202. Additionally, display module 204 supplies display monitor 202 with the new display boundaries created by the addition of display module 204. Display monitor 202 can confirm the display boundaries by detecting which couplers are communicating with display modules and which couplers are not communicating with display modules. The display boundaries are the limits of the visible desktop and are important in cursor movement as explained in conjunction with FIGS. 10-12.

As seen in FIG. 5, display monitor 202 manages data communications between the digital interface for the computer's video controller and display module 204. Display module 204 draws power and the additional row and column data from display monitor 202 to render the X and Y coordinate mapped pixel data. In turn, display module 204 provides its dimensions (which in turn could be of variable geometry, see FIG. 6) to display monitor 202. Display monitor 202 can become aware of the newly attached display modules in two ways. First, handshake signals could be used between display monitor 202 and the attached display module. Since the display module receives power from the display monitor, the handshake signal could be communicated the moment the display module is attached. Second, the display monitor processor (not shown) could scan the coupler bus (not shown) to instantly detect newly added display modules.

FIG. 6 shows a few examples of snap-in module sizes and aspect ratios, allowing of limitless combinations of resulting geometric surfaces. Display monitor 202 is capable of receiving multiple display modules, which are available in various sizes and can meet the display requirements of the individual user. Since display modules 602, 604, 606, and 608 have couplers 300 around their periphery, display modules 602, 604, 606, and 608 may be linked together and attached to display monitor 202 by couplers 300. If the display modules are directly attached to display monitor 202, as is the case with display modules 602, 606, and 608, the display modules directly communicate with display monitor 202. However, if the display modules are indirectly connected to display monitor 202, as is the case with display module 604, then display module 604 communicates with display monitor 202 via display module 606. Alternatively, display module 604 could communicate with display monitor 202 via display module 602. In FIG. 6, display monitor 202 represents a 1024×768 pixel array. Display module 602 represents a 1024×384 pixel array. Display module 604 represents a 340×384 pixel array. Display module 606 represents a 340×768 pixel array. Display module 608 represents a 170×384 pixel array.

Figure 7:
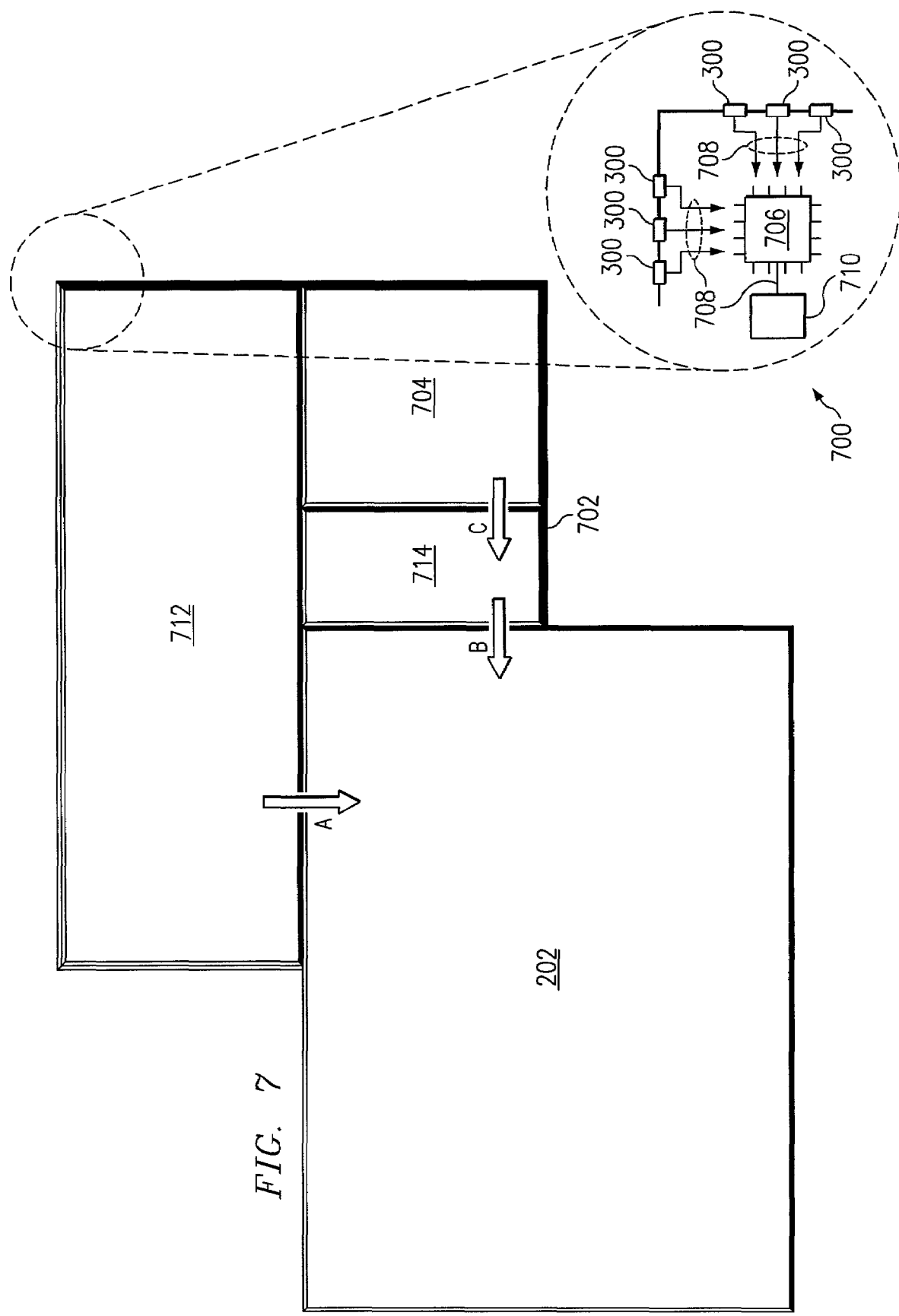
FIG. 7 is an illustration of the internal circuitry of the display modules and is also an illustration of the display monitor interacting with a plurality of display modules.

FIG. 7 shows a complex arrangement of display modules. The number and configuration of display modules is limited by the power delivery characteristics of the host system, though no different than daisy chained USB devices. As shown, each display module has its own CPU which is used primarily to assemble a map of connected devices and report the accumulated surface area. Each display module has a distinct ID, so that its surface area is not counted more than once. Arrow A shows display module 702 providing its dimensions to display monitor 202. The common boundary is already known by display monitor 202 as display monitor 202 scans the coupler bus for connected modules. Arrow B shows display module 714 providing its own dimensions and passing that of display module 704 (via arrow C connection) to display monitor 202.

FIG. 7 also shows internal circuitry 700 of display module 702. Internal circuitry 700 is representative of the internal circuitry of any of the display modules. Internal circuitry 700 comprises CPU 706, electrical connections 708, and memory 710. CPU 706 is connected to LCD screen 712 via electrical connections 708. Memory 710 and CPU 706 receive power from display monitor 202 via couplers 300 and electrical connections 708. The display module dimensions and module boundaries, which are communicated to display monitor 202 via electrical connections 708 and couplers 300, are stored in memory 710. CPU 706 receives data from display monitor 202 and displays the display data on LCD screen 712. In the case where a display module is indirectly connected to display monitor 202, CPU 706 passes along to display monitor 202 any communications received from indirectly connected display modules. Once the module is connected, its connectors become an extension of the main monitor in order to provide electrical and data connections to yet more modules. For example, once connected and recognized, display modules 714 and 702 act as extensions of display monitor 202 and detect display module 704, just as the display monitor 202 detected display modules 714 and 702.

Graphics rendering for the system is handled by an enhanced display device driver, resident on the operating system. The device driver works with the video controller and the monitor CPU to automatically reconfigure available real estate based on the currently attached display modules. The main display CPU then initiates or ceases the communication of row and column pixel data to modules that are respectively attached or detached.

In an alternative embodiment, it may not be necessary to include CPUs in the display modules as long as the display monitor processor can handle the extra row and column data. Most likely, only a modified version of the controller already present in the displays would be necessary. Display pixels are analogous to system memory; that is, memory modules are automatically recognized by the system, and extra grids of screen real estate can be recognized in the same way. The display processor (not shown) could handle the extra information provided sufficient memory exists. A CPU could be used to make the module smarter, but is not necessary to communicate the module size and shape.

Figure 8A:
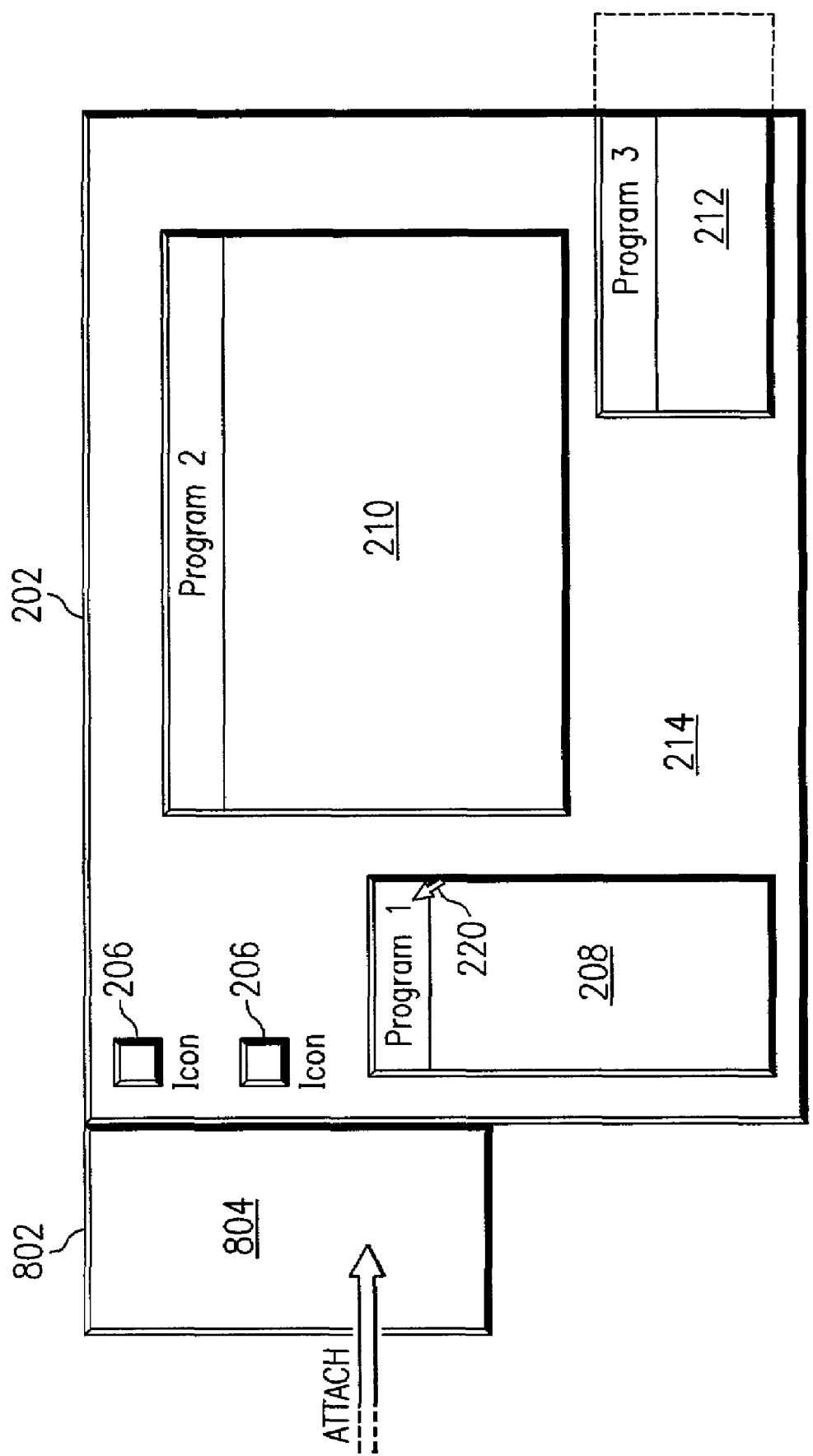
FIG. 8A is an illustration of the process of attaching the display module to the display monitor.
Figure 8B:
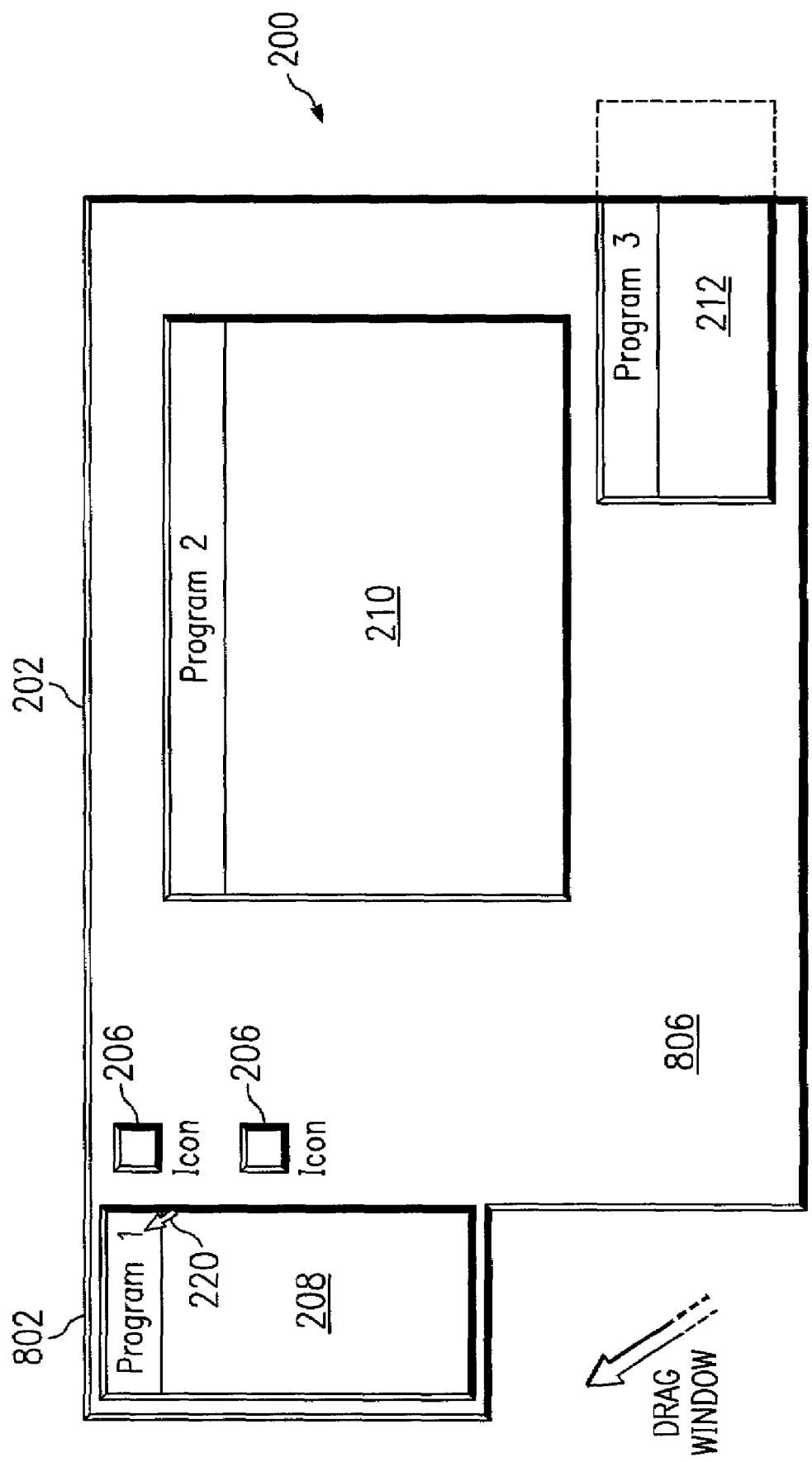
FIG. 8B is an illustration of the process of dragging an application onto the improved desktop created by the display module.

FIGS. 8A and 8B show the invention in its use with a graphical environment such as MICROSOFT WINDOWS, which incorporates movable application windows. While this invention has novel uses under such an environment, it is important to note that it is equally applicable to specific applications such as industrial control systems, where the interface is custom built to the screen real estate, which in turn needs to fit into an area of non-standard physical geometry.

FIGS. 8A and 8B illustrate the process of attaching display module 802 to display monitor 202 and navigating various applications within improved desktop 806. As indicated by the arrow in FIG. 8A, display module 802 is attached to display monitor 202, and the video drivers of display monitor 202 automatically recognize the addition of display module 802. Display monitor 202 provides power and display data to display module 802, enabling display module 802 to display the display module desktop 804. In a windowing graphical environment scenario, users are able to add display modules to create homes for frequently used programs, or programs they wish to remain visible at all times. For example, program 208 may be a user's favorite chat program and the user would like to see who is or is not online at any given time. So that program 208 is not obscured by other programs, the user could add display module 802 to the upper left side of display monitor 202 as seen in FIG. 8A. As display monitor 202 and display module 802 are capable of displaying images up to their edge, improved desktop 806 (FIG. 8B), which is a combination of display module desktop 804 and display monitor desktop 214 (FIG. 8A), is created.

Figure 8C:
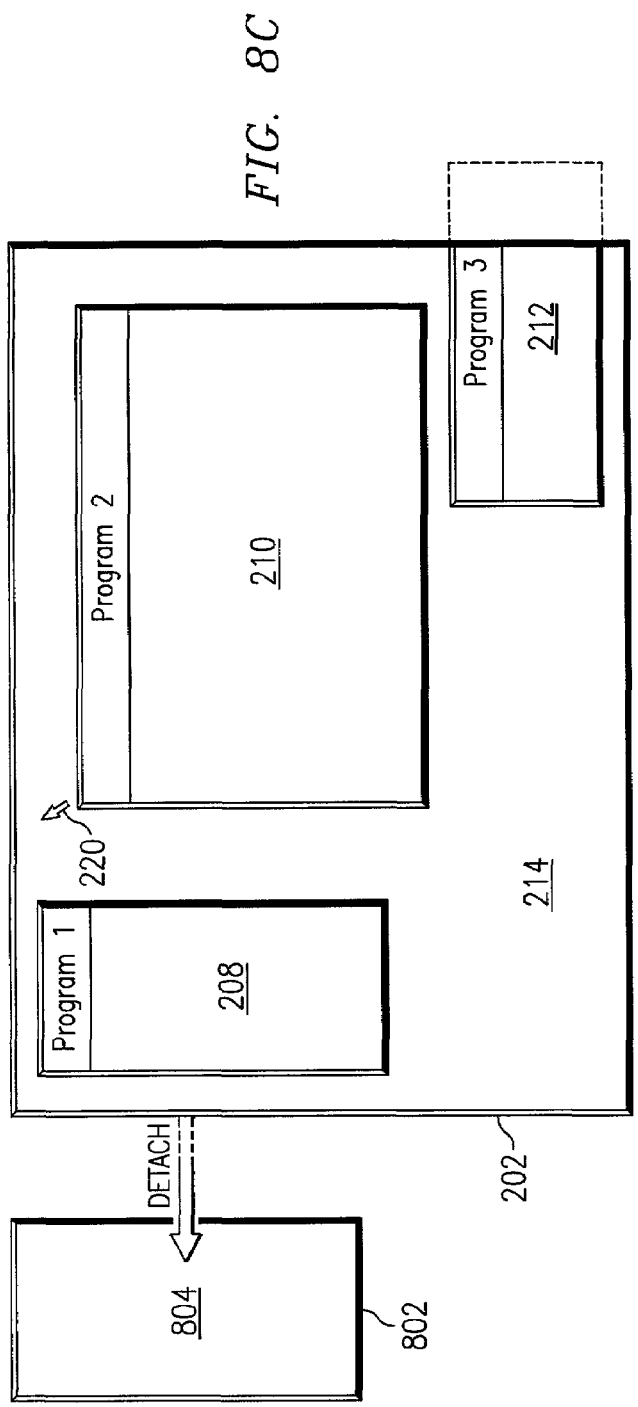
FIG. 8C is an illustration of the desktop behavior when the display module is removed from the display monitor.

Referring to FIG. 8B, the user can now use cursor 220 to drag program 208 into the new desktop space created by display module 802. As long as display module 802 stays attached to display monitor 202, program 208 will stay where the user puts it. Users can interact with the program as they would with any other program on the desktop. If display module 802 is detached (as illustrated in FIG. 8C), then program 208 dynamically pops desktop 214 back into display monitor 202, adjacent to where display module 802 was previously attached.

Figure 9A:
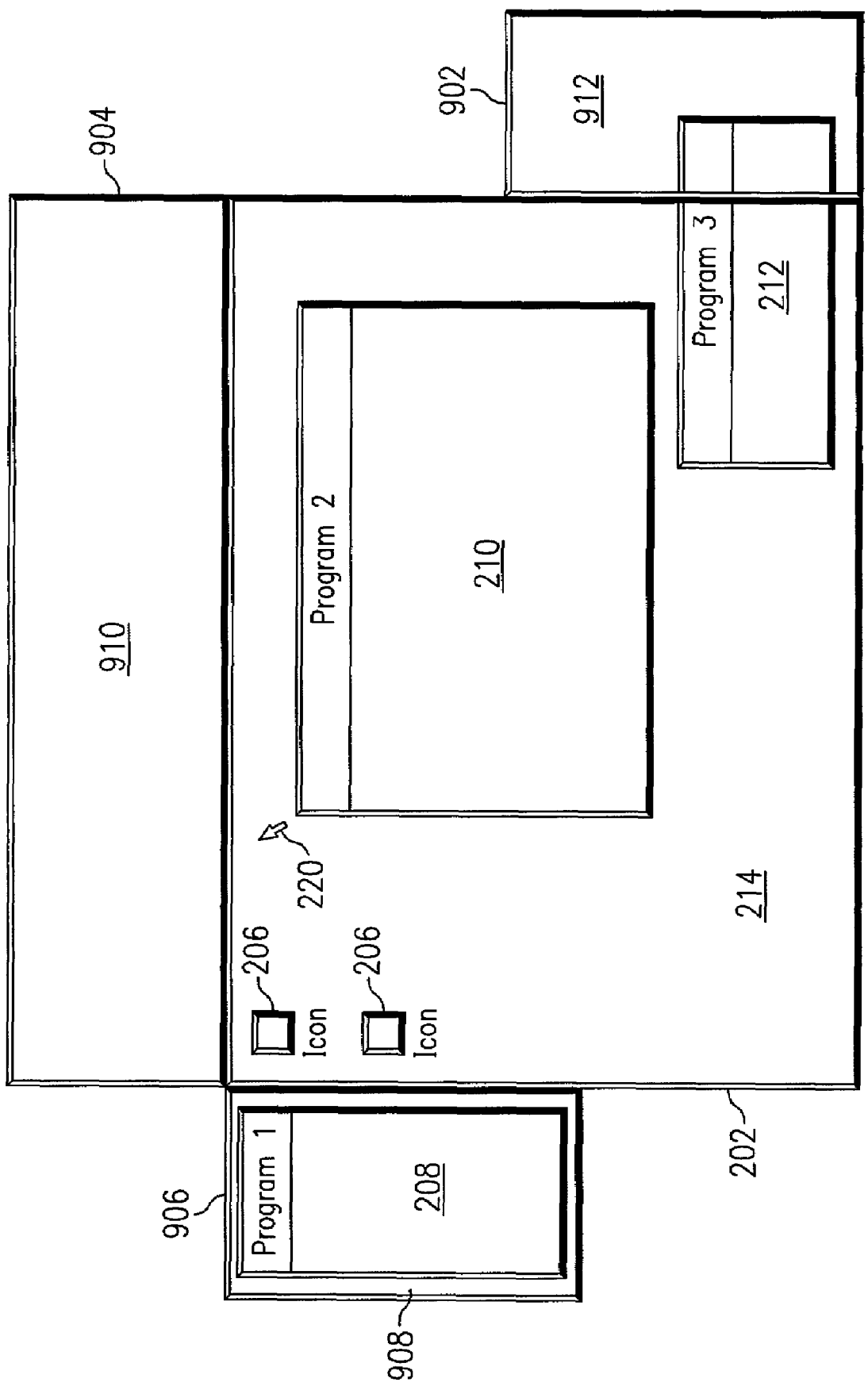
FIG. 9A shows how the display monitor can be customized by adding many different display modules.
Figure 9B:
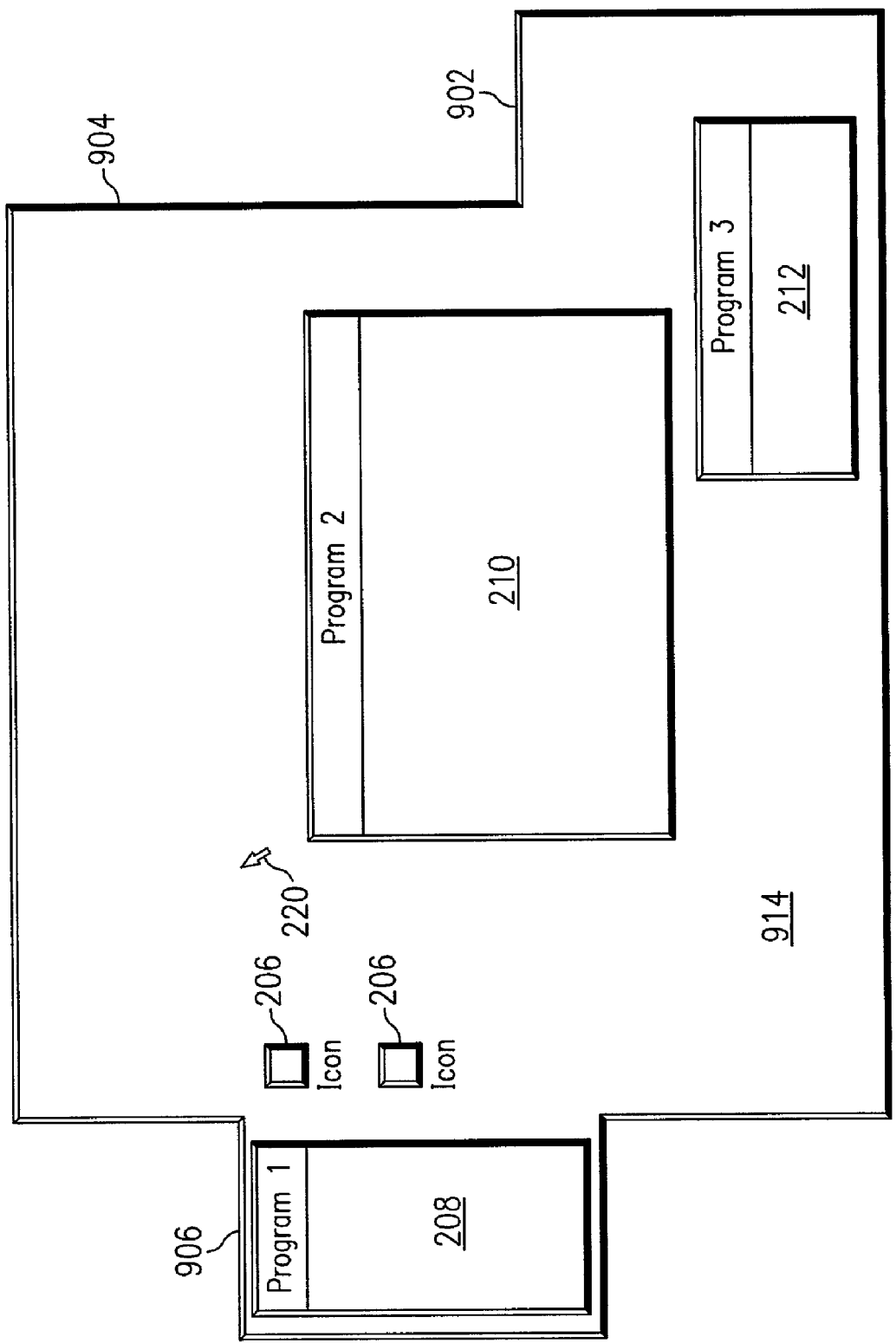
FIG. 9B shows the improved desktop after the addition of many different display modules.

Display modules can be made in a variety of sizes and shapes, allowing the user to customize the size and shape of their display as well as the corresponding visible desktop. FIG. 9A shows the addition of three modules: display module 906 on the upper left, display module 902 on the lower right, and display module 904 across the top. Display module desktops 908, 910, and 912 combine with display monitor desktop 214 to create improved desktop 914 (shown in FIG. 9B). Improved desktop 914 is a much larger, more flexible work environment compared to display monitor desktop 214.

Figure 12:
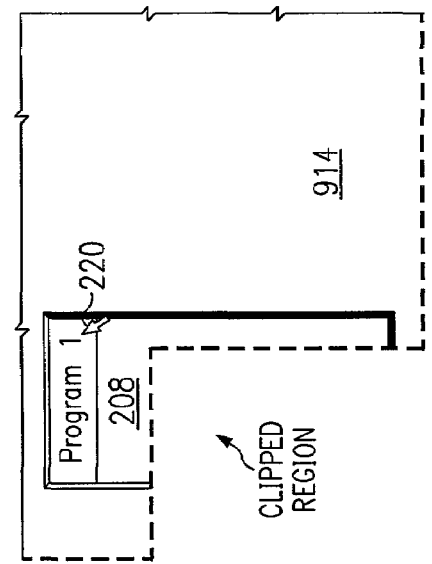
FIG. 12 shows that the invention allows applications to fall outside of the visible boundaries of the improved desktop.
Figure 11:
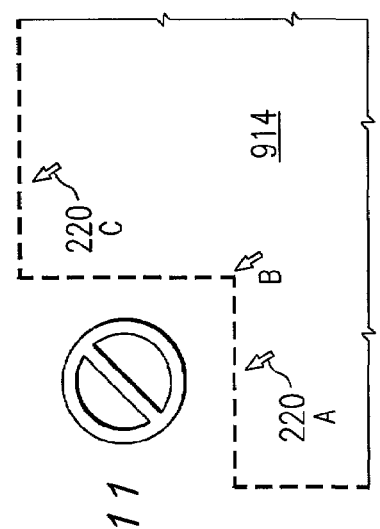
FIG. 11 illustrates the concept that the cursor cannot shortcut across the virtual desktop.
Figure 10:
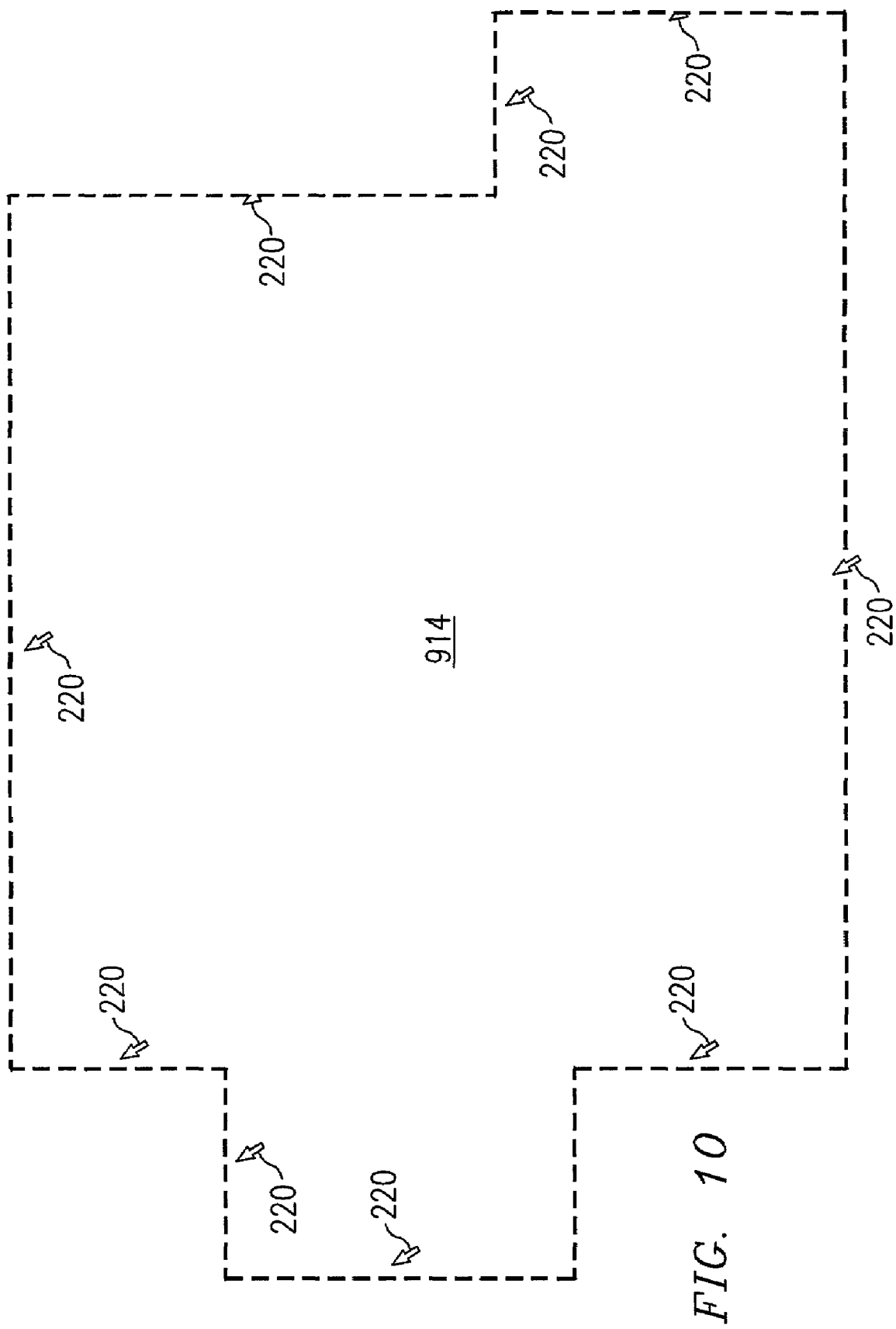
FIG. 10 shows the cursor boundary of the improved desktop.

Improved desktop 914 follows many of the same rules as display monitor desktop 214. Cursor 220 cannot leave the boundary of improved desktop 914 (as seen in FIG. 10), just as it could not leave the boundary of display monitor desktop 214. However, to solve a problem unique to non-rectangular desktops, cursor 220 cannot exit the improved desktop 914 at a point of concavity on improved desktop 914 in order to proceed at a diagonal into another portion of improved desktop 914. As seen in FIG. 11, the virtual desktop which is not displayed is still off limits to cursor 220. In order to get from point A to point C in FIG. 11, the user must navigate cursor 220 through point B. However, application windows and other objects are still allowed to fall outside of improved desktop 914, thus becoming clipped at the boundaries of the new display area as shown in FIG. 12. In this way, improved desktop 914 treats applications and programs in much the same way as display monitor desktop 214.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. An apparatus for displaying information comprising:
   screen surface;
   a back surface having a size that is substantially equivalent to the size of the screen surface;
   an edge surface joining the screen surface to the back surface; and
   alternating male and female couplers secured to the edge surface, for mating with substantially similar male and female couplers, supporting the weight of an electrical component, and transmitting power and data to a mated electrical component.

2. The apparatus of claim 1 wherein the screen surface is a first screen surface, the back surface is a first back surface, the edge surface is a first edge surface, and the apparatus further comprises:
   a second screen surface;
   a second back surface having a size that is substantially equivalent to the size of the second screen surface;
   a second edge surface joining the second screen surface to the second back surface; and
   alternating male and female couplers secured to the second edge surface and mated with the alternating male and female couplers secured to the first edge surface;
   whereby the alternating male and female couplers secured to the first edge surface transmit power and data to the alternating male and female couplers secured to the second edge surface, and information is displayed on the first screen surface and the second screen surface with visual continuity between the first screen surface and the second screen surface.

3. The apparatus of claim 1 wherein the alternating male and female couplers are cylindrical.

4. The apparatus of claim 3 wherein the distance between each male and female coupler is equal.

5. An apparatus for displaying information, the apparatus comprising:
   a processor; and
   a display monitor electrically engaged to the processor, the display monitor having
      a screen surface,
      a back surface having a size that is substantially equivalent the size of the screen surface,
      an edge surface joining the screen surface, and
      alternating male and female couplers secured to the edge surface, for mating with substantially similar male and female couplers, supporting the weight of an electrical component, and transmitting power and signals to a mated electrical component.

6. The apparatus of claim 5 further comprising:
   a display module having
      a second screen surface;
      a second back surface having a size that is substantially equivalent to the size of the second screen surface;
      a second edge surface joining the second screen surface to the second back surface; and
      alternating male and female couplers secured to the second edge surface and mated with the alternating male and female couplers secured to the edge surface of the display monitor;
   whereby the alternating male and female coupler secured to the edge surface of the display monitor transmit power and data to the alternating male and female couplers secured to the second edge surface of the display module, and information displayed on the screen surface of the display monitor and the second screen surface of the display module with visual continuity between the display monitor and die display module.

7. The apparatus of claim 6 wherein the processor is located in a computer and the display monitor and display module display a computer desktop.

8. The apparatus of claim 7 wherein the computer is portable and the display monitor is rotatably hinged to the computer.

9. The apparatus of claim 6 wherein the size of the second screen surface of the display module is less than the size of the screen surface of the display monitor, thereby forming a display surface having more than four sides.

10. The apparatus of claim 5 wherein the processor is located in a computer and the display monitor displays a computer desktop.

11. The apparatus of claim 10 wherein the computer is portable and the display monitor is rotatably hinged to the computer.

12. An apparatus for displaying information comprising:
a screen surface;
a back surface having a size that is substantially equivalent to the size of the screen surface;
an edge surface joining the screen surface to the back surface; and
means for electrically coupling the edge surface with a second apparatus;
wherein the electric coupling means supports the weight of the second apparatus and transmits power and data to the second apparatus.

13. The apparatus of claim 12 wherein the screen surface is a first screen surface, the back surface is a first back surface, the edge surface is a first edge surface, and the apparatus further comprises:
a second screen surface;
a second back surface having a size that is substantially equivalent to the size of the second screen surface; and
a second edge surface joining the second screen surface to the second back surface;
wherein the second edge surface is coupled to the first edge surface through the electric coupling means, so that the electric coupling means secures the first edge surface to the second edge surface and transmits power and data to display information on the first screen surface and the second screen surface with visual continuity between the first screen surface and the second screen surface.

14. An apparatus for displaying information, the apparatus comprising:
a processor; and
a display monitor electrically engaged to the processor, the display monitor having
a screen surface,
a back surface having a size that is substantially equivalent to the size of the screen surface,
an edge surface joining the screen surface to the back surface, and
means for electrically coupling the edge surface with a second apparatus;
wherein the electric coupling means supports the weight of the second apparatus and transmits power and data to the second apparatus.

15. The apparatus of claim 14 further comprising:
a display module having
a second screen surface;
a second back surface having a size that is substantially equivalent to the size of the second screen surface;
a second edge surface joining the second screen surface to the second back surface; and
means for electric coupling the second edge surface to die electric coupling means of the display monitor, so that the electric coupling means of the display module secures the display module to the display monitor and transmits power and data to display information on the display monitor and the display module with visual continuity between the display monitor and display module.

16. The apparatus of claim 15 wherein the processor is located in a computer and the display monitor and display a computer desktop.

17. The apparatus of claim 14 wherein the processor is located in a computer and the display monitor displays a computer desktop.

18. A computer program, encoded in a computer-readable media, for rendering graphics on an apparatus having a processor and a display monitor coupled to the processor, the computer program comprising:
means for detecting a display module coupled to the display monitor;
means for transmitting dimensions of the display module and the display monitor to the processor after exchanging the handshake signal;
means for converting the dimensions of the display module and the display monitor to boundary data representing the boundary of a computer desktop;
means for rendering the computer desktop on the display module and the display monitor with visual continuity between the display module and the display monitor;
means for rendering a cursor on the computer desktop; and
means for prohibiting the cursor from traversing the boundary of the computer desktop.

19. The computer program of claim 18 wherein the means for detecting a display module coupled to the display monitor comprises exchanging a handshake signal between the display module and the display monitor when the display module is coupled to the display monitor.

20. The computer program of claim 18 wherein the means for detecting a display module coupled to the display monitor comprises scanning a coupler bus when the display module is coupled to the display monitor.

* * * * *